United States Patent
Maier, Jr.

(10) Patent No.: US 7,162,970 B2
(45) Date of Patent: Jan. 16, 2007

(54) AUTOMATIC MILKING DEVICE WITH A CONTROLLABLE STIMULATION DEVICE AND STIMULATION SYSTEM

(76) Inventor: Jakob Maier, Jr., Griesstrasse 4, D-86842 Tuerkheim (DE)

( * ) Notice: Subject to any disclaimer, the term of this patent is extended or adjusted under 35 U.S.C. 154(b) by 0 days.

(21) Appl. No.: 10/471,046

(22) PCT Filed: Feb. 28, 2002

(86) PCT No.: PCT/EP02/02200

§ 371 (c)(1),
(2), (4) Date: Mar. 29, 2004

(87) PCT Pub. No.: WO02/069696

PCT Pub. Date: Sep. 12, 2002

(65) Prior Publication Data

US 2004/0168646 A1  Sep. 2, 2004

(30) Foreign Application Priority Data

Mar. 5, 2001  (DE) .............................. 101 10 473

(51) Int. Cl.
*A01J 3/00* (2006.01)

(52) U.S. Cl. .................. 119/14.18; 119/14.28; 119/14.38; 119/14.43; 119/14.44

(58) Field of Classification Search ............ 119/14.28, 119/14.29, 14.38, 14.41, 14.42, 14.43, 14.44, 119/14.01–14.18

See application file for complete search history.

(56) References Cited

U.S. PATENT DOCUMENTS

| | | | | |
|---|---|---|---|---|
| 1,859,214 A * | 5/1932 | McCornack | ............ | 119/14.13 |
| 4,011,838 A * | 3/1977 | Nordegren et al. | ...... | 119/14.08 |
| 4,190,021 A * | 2/1980 | Reisgies | .................. | 119/14.44 |
| 4,303,038 A | 12/1981 | Thompson et al. | | |
| 4,391,221 A * | 7/1983 | Hoefelmayr et al. | ..... | 119/14.08 |
| 4,790,261 A | 12/1988 | Wartenhorst | | |
| 4,941,433 A | 7/1990 | Hanauer | | |
| 5,218,924 A | 6/1993 | Thompson et al. | | |
| 5,673,650 A | 10/1997 | Mottram et al. | | |
| 5,697,323 A * | 12/1997 | Visigalli | .................. | 119/14.02 |
| 5,769,024 A | 6/1998 | Oernerfors et al. | | |
| 6,009,832 A * | 1/2000 | Innings et al. | ........... | 119/14.02 |
| 6,640,744 B1 | 11/2003 | Lincke | | |

FOREIGN PATENT DOCUMENTS

DE  12 14 036  4/1966

(Continued)

OTHER PUBLICATIONS

DE 50837 A1, Germany, Spillecke et al, English translation, 9 pages including title page.*

(Continued)

*Primary Examiner*—Andrea M. Valenti
(74) *Attorney, Agent, or Firm*—Flynn, Thiel, Boutell & Tanis, P.C.

(57) ABSTRACT

A stimulation device is provided for an automatic milking device having a plurality of milking cups. A vacuum device generates a negative pressure needed for milking and for the stimulation device. The stimulation device can be controllable to vary the stimulation independent from the pulsator system. Another system for stimulating milk producing animals includes a mobile stimulation device.

17 Claims, 3 Drawing Sheets

FOREIGN PATENT DOCUMENTS

| | | |
|---|---|---|
| DE | 1 607 023 | 8/1970 |
| DE | 29 34 511 A1 | 4/1980 |
| DE | 150 837 | 9/1981 |
| DE | 31 29 972 | 2/1983 |
| DE | 211 920 | 7/1984 |
| DE | 297 07 651 U1 | 9/1997 |
| DE | 196 23 386 A1 | 12/1997 |
| DE | 297 10 100 | 2/1998 |
| DE | 19711250 A1 * | 6/1998 |
| DE | 197 17 905 A1 | 10/1998 |
| DE | 198 11 534 A1 | 9/1999 |
| DE | 199 26 957 | 1/2001 |
| DE | 100 18 870 A1 | 10/2001 |
| EP | 0 189 954 | 8/1986 |
| EP | 0 630 567 | 12/1994 |
| EP | 0 951 820 | 10/1999 |
| EP | 0 954 962 | 11/1999 |
| EP | 1 060 657 A1 | 12/2000 |
| EP | 1 068 796 A2 | 1/2001 |
| FR | 2530119 A1 * | 1/1984 |
| GB | 2 191 927 | 12/1987 |

OTHER PUBLICATIONS

English translation German Patent DE 1214036 to Lorenz Widmann, Apr. 1965, 4 pages.*

English Translation, DE 19711250 to P. Maier, 1998, Device for Milking, 13 pages+ title page.*

Milking machine installations—Vocabulary, ISO 3918, Mar. 1998, 15 pages.

* cited by examiner

AUTOMATIC MILKING DEVICE WITH A CONTROLLABLE STIMULATION DEVICE AND STIMULATION SYSTEM

The present invention relates to an automatic milking device with a plurality of milking cups, a vacuum device generating the negative pressure needed for milking and a stimulation device. The present invention is also concerned with a system for the stimulation of a milk producing animal.

Nowadays, automatic milking devices of the type mentioned herein above are mainly used in milk producing farms. The increasing economical pressure due to price stagnation or, possibly, even falling prices for milk and milk products call for making optimal use of the milk producing animals at minimum operational costs for the farm. However, the recent developments in the field of keeping domestic animals clearly show that, in addition to an optimal technical conception of the farms and of the associated sub-contractors, the animals are likewise required to be kept as far as possible according to species and in such a way as to ensure their health and well-being.

More specifically, the milking process should be as time-efficient as possible for the farmer on the one hand and performed so as to be as convenient as possible for the animal and to meet the needs of the species on the other hand so that permanent high production is ensured in spite of machine milking. For milking cows, it is known that the udder of the animal must first be stimulated in order to prepare the animal for the imminent milking process and to ensure that the milk is forced out of the alveoli, which house the milk-producing cells, into the cisterns (udder engorgement). Only if the milk-producing cells are regularly and completely emptied will the cow be encouraged to permanently produce the large quantities of milk consistent with the physiological characteristics of the animal and the quality of the forage. As in automatic milking machines of the type mentioned herein above the milking cups are attached to the teats by application of a vacuum, it is necessary, for optimum milking process conditions, that no milk be drawn before udder engorgement because otherwise, if one quarter of the udder has been emptied, the negative pressure in the milk duct would lead to contraction and permanent spasm of the muscles involved. Frequently, what is termed hand stimulation is performed prior to applying the milking cups of the automatic machine in order to initiate the physiological process described herein above. Usually, a period of at least 1 minute is needed to release the hormone required for this physiological process. As a result, and more specifically where large stocks are to be milked, the required hand stimulation cannot be performed because of lack of time so that a stimulation device for delivering appropriate mechanical stimuli to the animal is provided for in the milking machine. For this purpose, in a prior art milking machine, the pressure variations, which are generated by what is termed a pulsator and are applied periodically to the region between the teat rubber liner and the milking cup, are used to generate substantially vertical pulsations in the milking units by means of an accordingly designed pulsator line of variable length. There is the risk though that the milking cup "creeps upward" along the teat, which may result in a constriction and in a reduced milk flow. The amplitude of the pulsation and the intensity of the mechanical stimulus applied depend on the weight of the collecting piece that is connected to the milking cups by means of the pulsator lines and flexible milk lines. Further, the frequency of the mechanical stimulation delivered is constant since the pulsator frequency is fixed and amounts, in current systems, to about 57 to 62 Hertz.

In order to achieve an improved and possibly an individually adjustable stimulation of the animal, it is therefore the object of the present invention to provide an automatic milking machine having an improved stimulation device. Another object of the present invention is to provide a system for a comprehensive and individual stimulation of a milk producing animal.

In view of the problem mentioned herein above, the present invention provides an automatic milking device of the type mentioned herein above that is characterized in that the stimulation device is controllable.

In accordance with the invention, the controllable stimulation device permits to achieve a stimulation which is selectable for example within a certain frequency range and independent of the milking process. More specifically, the frequency of the stimuli applied is independent of the pulsator frequency of the milking machine as a result thereof, which permits adjustment to the individual needs of each animal. Further, the milking machine of the invention permits to change the stimulation frequency used during the milking process. More specifically, it may be advantageous to adjust the frequency of the stimuli applied to the various phases of the milking process. It may thereby be advantageous to increase the frequency of the stimuli delivered after milking in order to fully empty the udder quarters. Further, stimulation may be controlled separately for every udder quarter so that, more specifically when combined with a suited milk flow meter for each udder quarter, stimulation may be adjusted to the respective degree at which an udder quarter has been milked out.

In another embodiment, the controllable stimulation device is capable of producing frequency and/or amplitude controlled stimuli.

Thanks to the stimulation device in accordance with the invention, the frequency and/or the amplitude i.e., the intensity of for example mechanical stimuli can be adjusted accordingly, which, more specifically when combined, permits to enhance both the production and the health of the animals to be milked.

In a further embodiment, the controllable stimulation device comprises a flexible, in parts variable length, fluid connecting line between the vacuum device and the respective milking cups and a controllable valve element so that the length of the fluid connecting line of variable length is varied upon actuating the valve element by varying the pressure.

This embodiment permits in a simple manner to transmit, by means of the variable length fluid connecting line, for example in the form of a flexible tube having in parts a bellows-like structure, pressure variations acting as mechanical stimuli to the teat or the udder of the animal.

In another implementation, the controllable valve element is an electromagnetic valve element. Appropriate electromagnetic valve elements are easy to actuate, mechanically stable and small so that a suited valve element may be provided both directly on the variable length fluid connecting line and on the stationary element mounted to the vacuum device.

In another implementation, the controllable valve element is a pneumatic valve element. If the valve element used is a pneumatic valve element, it may be provided directly on the variable length fluid connecting line, with no electrical supply lines being required.

In another embodiment, the controllable valve element is continuously controllable, at least in portions thereof, so that a frequency and/or a maximum deviation of the length variation is continuously adjustable, at least in parts.

This embodiment permits to adjust in a simple manner both the frequency and the amplitude of a mechanical stimulus applied to the teat. Accordingly, pressure variations may be applied periodically to the variable length fluid connecting line through a proportional control valve, both the frequency and the magnitude of the pressure difference being adjustable through the variable regulating distance of the proportional valve.

In a further embodiment, the controllable stimulation device comprises a fluid connecting line between two or a plurality of milking cups, the length of which may be varied by varying the pressure, and a controllable valve element, at least one connection being provided to connect the valve element to the vacuum device.

This embodiment permits to directly mechanically couple two or a plurality of milking cups to one another through a variable length fluid line, for example a flexible tube with a bellows-like structure, so that the controllable valve element causes the milking cups to mechanically vibrate, with the vibrations having a large horizontal component. More specifically, this embodiment permits, when combined with substantially vertical stimulation vibrations, to stimulate the animal within a larger and, as a result thereof, more diversified stimulation range.

In still another embodiment, the stimulation device comprises a vibrator element that is adapted to be mechanically coupled with a respective one and/or with a plurality of the milking cups.

Many types of mechanical vibrations may be generated using a vibrator element so that the achievable frequencies are much higher than with controllable valve systems. More specifically if one vibrator element is provided for a respective one of the milking cups, the milking cups may be vibrated independent of each other. Such a disposition is not only advantageous for the individual stimulation of every teat in systems in which the milking units are applied manually, but is also of particular advantage when combined with fully automated milking systems, which are termed milking robots, in which the various milking cups are moved automatically and mechanically independent of one another. In such type milking robots, a "collective" stimulation of the teats may only be performed at great expense.

In another implementation, the vibrator element may be coupled with a respective one and/or with a plurality of the milking cups by means of fluid connecting lines.

This embodiment permits in a simple manner to provide already existing elements of an automatic milking system (with manual application of the milking units) such as milk tubes and pulsator tubes with a vibrator element according to the invention and to thus transmit the mechanical vibrations generated by said vibrator to the milking cups by means of the connecting tubes. Further, the mechanical vibration of the vibrator element may be transmitted efficiently, either in addition or exclusively, through flexible connecting elements, suited flexible connection elements being available in the form of mass produced goods, and at low cost as a result thereof.

In still another implementation, the vibrator element comprises an electromagnetic and/or a piezoelectric and/or a hydraulic vibrator element.

More specifically, the use of electromagnetic and/or piezoelectric, vibrator elements permits to generate mechanical vibrations within a wide frequency range, with the corresponding element having a very small size.

In another embodiment, each milking cup comprises a teat rubber liner that is adapted to be coupled with the controllable stimulation device and to transmit mechanical vibrations to the teat.

An accordingly designed teat rubber liner offers the advantage that accordingly generated mechanical vibrations or stimuli are directly transmitted to the teat. Further, a teat rubber line of such a design offers the possibility to receive an accordingly small vibrator element, a piezoelectric vibrator element for example, for locally stimulating an area of the teat.

In another embodiment, the teat rubber liner comprises an intermediate region between the inner surface, which comes partially into contact with the teat and the inner surface of the milking cup, said intermediate region being at least partially filled with a deformable mass.

This type of teat rubber liner configuration permits to provide the smooth inner surface needed for providing a tightly fitting shape and for easy cleaning, said deformable mass concurrently massaging the teat by being moved or rather by being displaced by the stimulation device. Advantageously, one region of the teat rubber liner, to which external pressure is applied in order to terminate the suction phase, is not provided with a corresponding intermediate region so that the teat rubber liner may fold together without being negatively affected.

In another embodiment, the deformable mass comprises a mixture of oil and water and/or a gel and/or small pieces of material the dimensions of which range from about 0.5 mm to 5 mm.

The provision of a deformable mass of the type mentioned herein above produces a pleasant massaging effect on the animal, thus promoting the stimulation before, during and after the milking process.

In another implementation, the intermediate region comprises a fluid connection which is closed inward by a membrane.

Pressure, or rather pressure variations, which are for example generated by the stimulation device, are applied to the deformable mass by means of said fluid connecting line in order to provide varying massage stimuli to the animal. This type of massaging effect may more specifically contribute to considerably increase the stimulation effect in the initial phase prior to the actual milking process and in the after milking phase.

In another implementation, the membrane is impermeable and elastic so that pressure variations on the side of the connection are transmitted to the deformable mass without fluid penetration.

It is thus possible to transmit in a simple manner the air pressure variations generated by the controllable stimulation device to the deformable mass and, as a result thereof, efficiently to the teat.

In another implementation, the membrane is a mesh structure having a mesh size of less than 0.5 mm.

If the deformable mass is made of small pieces of material the size of which exceeds 0.5 mm, the thus configured membrane permits to lead the fluid, for example water or air, through the intermediate region in order to produce an intensive massaging effect.

In another embodiment, the teat rubber liner, the intermediate region, the membrane and the fluid connection are implemented as an integral element.

This embodiment permits to easily replace a conventional teat rubber liner by the teat rubber liner of the invention which may be mass produced at low cost thanks to its integral construction. Further, an additional connection or an appropriate implementation of the fluid connection permits to fill the intermediate region with different fillings employed as the deformable mass.

In another embodiment, the intermediate region comprises one or a plurality of sections the volume of which may be varied by introducing a fluid.

The formation of one or several such sections is advantageous to locally stimulate certain teat areas if an increase in volume causes a corresponding section of the teat rubber liner to apply an increased force to the teat as a result of the counterpressure of the milking cup. This kind of stimulation permits to even further optimize and adapt the milking process to the natural sucking performance of the calf. Thus, the stimulation occasioned by the calf's lips in the upper region of the teat may be imitated by accordingly varying the volume of the upper region of the teat rubber liner. For this purpose, experimentally obtained data are preferably used so that a corresponding stimulation sequence is performed, either manually or automatically. An appropriate stimulation sequence may advantageously be implemented in the above mentioned control system.

In another embodiment, the stimulation device comprises a heating system configured to generate temperatures ranging from 20 to 45.degree. C. at the teat rubber liner.

The heating system permits to provide a temperature that imitates the natural sucking performance of the calf, which is of about. 35.degree. C., from the very application of the milking cup, thus additionally stimulating the animal by preparing it to the milking process to be performed.

In another implementation, the heating system comprises an electrical heating element. Desired areas of the teat rubber liner may thus be readily and selectively heated, more specifically if the electrical heating element is provided on the inner side of the milking cup.

In another implementation, the heating system is configured so as to allow a temperature equalized fluid to flow therethrough. More specifically if the heating system comprises flow channels within the teat rubber liner, a stimulating effect may be achieved, in addition to the temperature induced stimulation, by the flow of fluid such as water.

In another embodiment, the milking system comprises a control unit that controls the stimulation device in accordance with a functional sequence implemented in the control unit.

A suited stimulation or sequence can be performed automatedly by means of the control unit of the invention.

In a further embodiment, a timer is provided so that the control unit is capable of controlling the stimulation device as a function of the milking time.

This embodiment more specifically permits to keep the time required for the animal to be sufficiently stimulated prior to the actual milking process, so that every milking process may yield optimum results.

In another variant, a milk flow sensor is provided so that the control unit is capable of controlling the stimulation device as a function of the quantities of milk already achieved and/or of the actual milk flow.

This measure permits to optimally adapt the stimulation to the milking process taking place. More specifically, if the milk flow drops, the frequency and/or intensity of the stimulation may be varied in order to optimally milk out the udder. The milk flow sensor may thereby be configured so as to detect the milk flow of every single teat so that every single teat may be stimulated individually in compliance with the detected flow rate of the milk flowing out of the respective one of the udder quarters.

In a further embodiment, a temperature sensor and a control circuit are provided so that the temperature in the milking cup is regulatable. This permits, inter alia, to keep the temperature of the milking cup constant even in the phase in which, in conventional systems, there is a clear drop in temperature when the milking units are being changed.

In another implementation, the control circuit is implemented in the control unit so that a temperature dependent stimulation control may be integrated into the functional sequence of the control unit. This permits to readily use the temperature at the teat as a suited stimulus. More specifically when combined with a massaging system, a temperature, which is higher than the temperature usually achieved in conventional systems in which the teat rubber liner is heated by the body, may contribute to clearly enhance the circulation of blood in the teat tissue.

In another embodiment, the control unit comprises a data entry region through which data, more specifically data related to the animal to be milked, may be entered manually and/or automatically.

The data entry region of the invention permits to enter data that accordingly control the stimulation. As a result, a functional sequence that is individually adjustable to every single animal may be selected and performed.

In a further embodiment, the control unit comprises a memory region which may store the data related to the milking process and more specifically the parameters related to stimulation.

This embodiment permits to store stimulation related parameters used for a certain animal and to retrieve them when the next milking process is to take place. Further, if the appropriate sensors are provided, data such as the quantities of milk or the milk flow rate may be recorded. More specifically, the control unit may contain an optimization program in the memory region, said optimization program recording, over a long period of time, the efficiency of certain stimulation parameters such as frequency and amplitude of mechanical stimuli as a function of the quantities of milk achieved. The thus determined optimum parameters may then be used as standard values for one or a plurality of animals.

According to another aspect of the present invention, an automatic milking device comprises a plurality of milking cups, a collecting piece in fluid communication with the milking cups, a vacuum device generating the negative pressure required for milking, a pulsator system in fluid communication with the collecting piece and provided with pulsator tubes for connecting the collecting piece and the milking cups, and a stimulation device, the milking system being characterized in that the pulsator tubes comprise a region of variable length that is horizontally coupled to the collecting piece when the collecting piece is in the operative position.

This embodiment generates in a simple manner a large horizontal vibration component that leads to an intensive vibration and accordingly to the stimulation of the udder. Advantageously, this embodiment may be combined with the embodiments described in the first aspect of the present invention.

According to another aspect of the present invention, a system for stimulating a milk producing animal is provided, the system comprising a stimulation device for physical stimulation and a stimulation device for optical and/or acoustic stimulation.

As already mentioned herein above, the optimum stimulation or the animal plays an important part in achieving high yields and in ensuring lasting health of the animal. It is therefore important to deliver, in addition to the physical stimuli, which are substantially limited to the teats and the udder, other type of stimuli, more specifically optical and acoustic ones, to the animal before and during the milking process. A suited acoustic stimulus before and during the milking process for example clearly permits higher quantities of milk to be achieved.

In another embodiment, the optical/acoustic stimulation device comprises a head covering with an integrated loudspeaker system that is connectable to an appropriate sound source.

This embodiment permits to individually configure the acoustic stimuli for the animal to be milked substantially independent of the constant sound level in the stall.

In a further variant, the optical/acoustic stimulation device comprises a device for sending optical signals. More specifically, the animal to be milked may efficiently be protected against other optical influences if the device for sending optical signals is integrated in a head covering permitting the individual reception of the optical signals such as coloured light and the like.

In another embodiment, the system comprises a control unit that controls the stimulation device for physical stimulation and the stimulation device for optical/acoustic stimulation. The control unit of the invention permits to select a choice of appropriate stimuli and to provide them in an optimum timely order. Further, the control unit makes it possible to intervene, if necessary, in the stimulation process by controlling it automatically or manually.

According to another aspect of the present invention, a mobile stimulation device is provided to stimulate a milk producing animal, the stimulation device being intended to be secured, by means of a securing element, to the milk producing animal and/or to an element of an automatic milking system, more specifically to a fluid tube which is in communication with a milking cup and comprises a switching system for the manual and/or remotely controlled application of a stimulus.

The mobile stimulation device of the invention permits to secure it anywhere on the animal, for example to the udder, and to apply stimuli to the animal for example shortly before the milking process. As a result, the animal may be prepared to the imminent milking process even before the milking units are applied, so that the stimulation phase with the, milking units being applied is shortened, which permits to use the milking system in a timely efficient manner. Further, the mobile stimulation device of the invention may be secured to an element of the milking system in such an advantageous manner that stimuli sent by the stimulation device are efficiently transmitted to the udder of the animal, so that already existing milking systems can be retrofitted with this efficient stimulation device thanks to this disposition in accordance with the invention.

In another embodiment, an electromagnetic and/or piezoelectric vibrator element for generating mechanical pulsations or vibrations is provided. This embodiment permits a compact and efficient vibrator element that generates mechanical vibrations within a wide frequency and amplitude range.

In a further embodiment, a current supply for a temporarily self-sufficient operation of the stimulation device is provided. An integrated current supply permits a construction without any external feed lines which offers the possibility to also secure the stimulation device in accordance with the invention to animals in a pasture situation.

In a further embodiment, a communication unit for wireless communication with a peripheral is provided. This embodiment is particularly advantageous in connection with an integrated current supply since no feed wires are needed and a stimulus can be applied by means of an optical, an acoustic or an electromagnetic signal. More specifically, if the mobile stimulation device comprises a suited electronic circuit, data may be exchanged between the mobile stimulation device and a central computer system for example. The mobile stimulation device may for example send an identification signal to the central computer unit which may in turn select, on the basis of the identity received, a suited stimulation program and send appropriate instructions to the mobile stimulation device. Further, the stimulation process may be initiated at a certain preselected time, the time being determined by an external computer unit or by a timer provided in the mobile stimulation device.

Further objects, aspects and advantages as well as embodiments will become apparent in the following detailed description and in the appended patent claims. Exemplary embodiments will be described in detail herein after with reference to the accompanying drawings in which:

Figure 1:
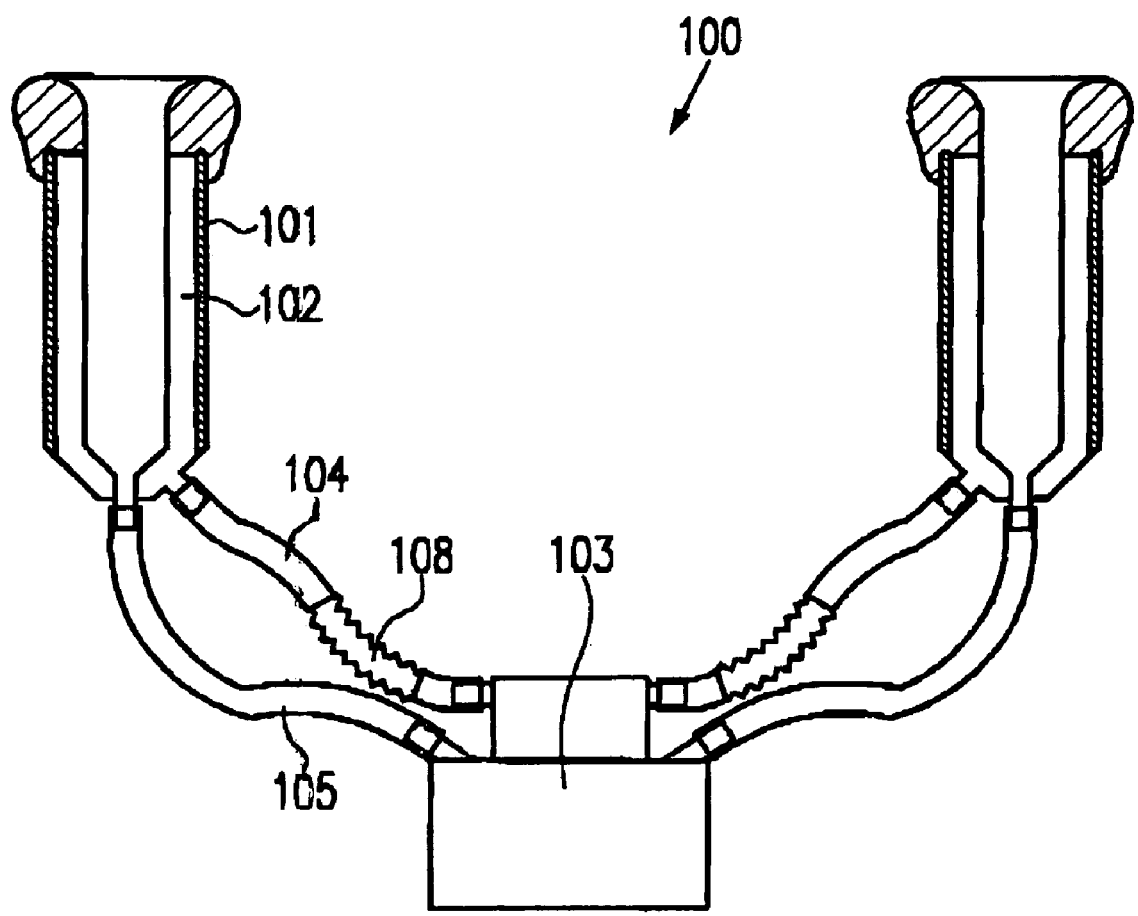
FIG. 1 is a schematic view of a first embodiment of the present invention with a variable length pulsator tube that causes the udder to vibrate substantially horizontally.

FIG. 1 is a schematic cross-sectional view of a portion of a milking unit 100 of an automatic milking system (not shown), only two milking cups 101 being shown for simplicity sake. In the drawing, but one half bears reference numerals since the two milking cups with the associated connections are built identically. Within, the milking cup 101 is equipped with a flexible teat rubber liner 102 that is only shown schematically in this and in the following drawings. Those in the art know that the teat rubber liner 102 is structured in the upper region so that a good seal is provided relative to the teat. The space between the milking cup 101 and the teat rubber liner 102 forms a chamber to which vacuum and pressure are alternatively applied and is connected to a collecting piece 103 by means of a flexible pulsator tube 104. For simplicity sake, the pulsator and the associated connecting line to the collecting piece 103 are not shown. The inner volume of the teat rubber liner 102 is also connected to the collecting piece 103 by means of a flexible milk tube 105. A stimulation device is further provided, said stimulation device consisting, in the example shown, of a region of variable length 108 provided on the pulsator tube 104, said region of variable length 108 being substantially horizontally secured to the collecting piece. The term horizontal hereby designates the direction in the operative position of the milking unit 100. A vacuum device is further provided (not shown), said vacuum device being in fluid communication with the collecting piece 103.

In operation, the pulsator periodically delivers negative pressure and atmospheric pressure to the collecting piece 103, which in turn transfers the negative/atmospheric pressure via the pulsator tubes 105 to the intermediate region between the milking cup 101 and the teat rubber liner 102. As a result of these pressure variations, the length of the region of variable length 108 of the pulsator tube 104 is reduced. As a result of the pulsator tube 104 being horizontally secured to the collective piece 103, the udder starts to swing as contrasted with a conventional system. A mechanical stimulation with a large horizontal component is thus obtained, which leads to enhanced stimulation of the animal.

Figure 2:
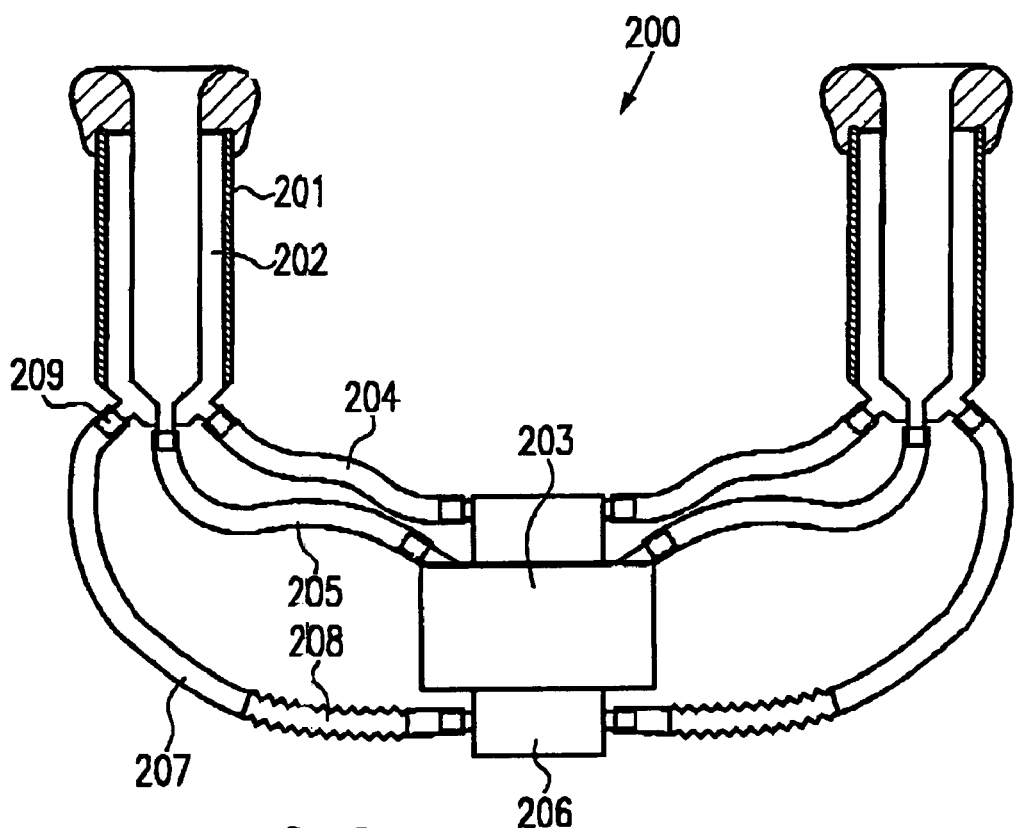
FIG. 2 is a schematic view of an embodiment of a milking unit with a controllable stimulation device.

FIG. 2 shows a schematic cross sectional view of a portion of a milking unit 200 of an automatic milking system (not shown), with only two milking cups 201 being shown for simplicity sake. In the drawing, but one half bears reference numerals since the two milking cups with the associated connections are built identically. Within, the milking cup 201 is equipped with a flexible teat rubber liner 202. Further, the intermediate space between the milking cup 201 and the teat rubber liner 202 is connected to a collecting piece 203 by means of a flexible fluid line 204. The inner volume of the teat rubber liner 202 is also connected to the collecting piece 203 by means of a flexible milk tube 205. A stimulation device is further provided which, in the example shown, consists of a valve element 206 secured to the collecting piece 203, a flexible fluid line 207 with a region of variable length 208 and a securing sleeve 209. A vacuum device is further provided (not shown), said vacuum device being in fluid communication with the collecting piece 203.

In operation, the teat rubber liner 202 on the milking cup 201 is pulled over the teat of an animal to be milked and is retained thereon by means of a negative pressure which is generated by the vacuum device and is transferred to the teat, via the collecting piece 203 and the fluid connecting line 205. Typically, the vacuum device comprises what is termed a pulsator system that, during the milking process, periodically supplies the intermediate volume between the milking cup 201 and the teat rubber liner 202 with negative pressure and atmospheric pressure via the fluid line 204 in order to periodically fluidically remove the teat from the milk tube 205 by folding the teat rubber liner 202. As contrasted with conventional milking systems in which the stimulation of the udder is often achieved in that the pulsator tube 204 comprises a region of variable length that contracts periodically at a frequency dictated by the pulsator, thus mechanically stimulating the teat at the pulsator frequency, the controllable stimulation device of the invention permits controlled stimulation by means of the controllable valve element 206 which, in the example shown, is connected, via line 207, to two milking cups and which is further connected to the vacuum device (not shown) or to an additional system capable of providing a negative pressure or excess pressure. The valve element 206 may thereby be controllable, for example by externally supplied signals or by internally produced signals, in order to generate, in a frequency range dictated by the control, signals, pressure variations in the line 107, the length of the region of variable length 208 varying as a result of said pressure variations. This leads to the desired stimuli at the teat of the animal.

In an illustrative embodiment, the valve element 206 is configured to be an electrically actuatable valve element that communicates with the atmosphere and accordingly controllably generates pressure variations in the fluid connecting line 207. Advantageously, the valve element 206 is configured to be a proportional valve so that, in addition to the frequency, the intensity of the pressure variations is controllable as well. Stimuli of up to about 20 Hz may be generated using commercially available proportional valves with a response time of about 50 to 200 msec. In the embodiment shown in FIG. 1, the valve element 206 is secured to the collecting piece 203 in order to efficiently generate, as a result of the relative large mass of the collecting piece 203, mechanical stimuli. In order to vary the mechanical stimuli, an additional weight such as a liquid container may be provided.

In still another embodiment that has not been illustrated herein, a two-chamber pulsator tube 204 may be provided instead of the fluid connecting line 207, the outer chamber of said pulsator tube being connected to the valve element 206 and the two-chamber pulsator tube comprising a region of variable length that is responsive to pressure differences within said outer chamber. Further, the embodiment shown in FIG. 1 is provided with a securing sleeve 209 that is mounted to the milking cup 201 and is intended to transfer the length contraction of region 208 to the milking cup. The fluid connecting line 207 may be secured by any other means though. The end region or the fluid connecting line 207 may for example be secured to one of the connecting sleeves for the milk tube 205 or the pulsator tube 204.

Figure 3:
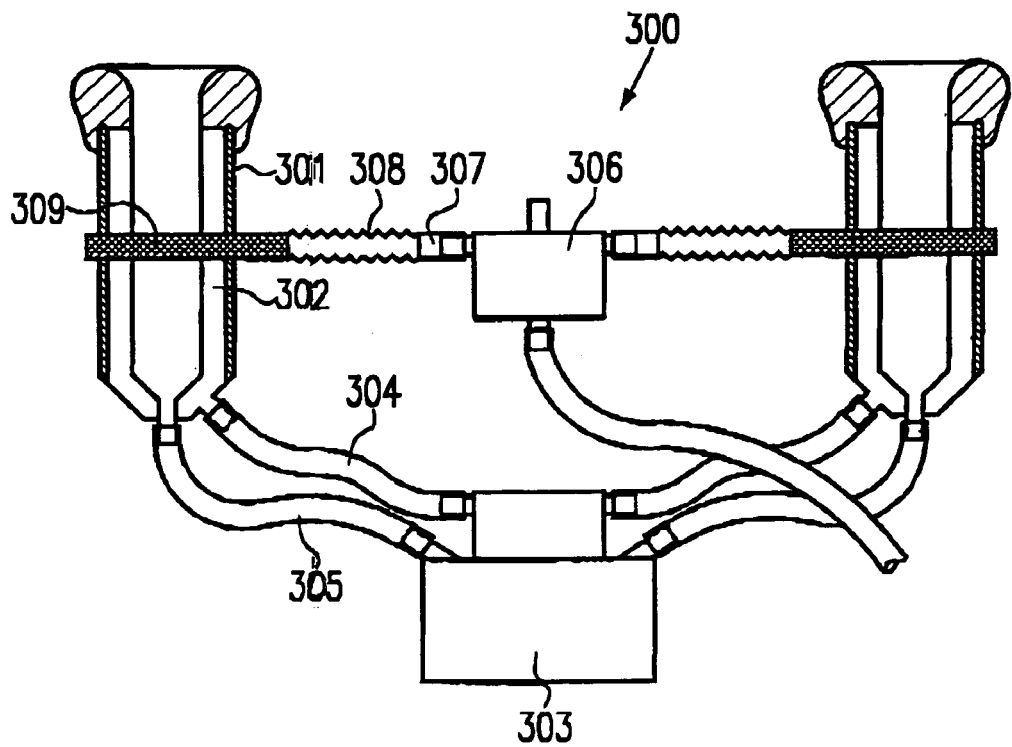
FIG. 3 is a schematic view of an embodiment according to the present invention with two or more milking cups of a milking unit being directly mechanically coupled together.

FIG. 3 schematically shows a variant of the embodiment shown in FIG. 2. Referring to FIG. 3, like or similar elements bear the same reference numerals as in FIG. 2, except that they are preceded by the numeral "3" instead of the numeral "2". In this embodiment, a controllable stimulation device in accordance with the invention comprises a vibrator element 306, a flexible connecting element 307 with a region of variable length 308 and a securing region 309. In the embodiment shown, the vibrator element 306 is a valve element that is in fluid communication with the vacuum device (not shown) for example. The flexible connecting elements 307 are implemented as fluid connecting lines in this case. Controllable pressure variations cause the two milking cups, to which the fluid connecting lines 307 are secured, to mechanically vibrate accordingly.

An electromagnetic transducer, a piezoelectric transducer, a pneumatic vibrator element and the like may be used instead of the valve element 306. The elastic connecting elements 307, which, more specifically if electromagnetic and/or piezoelectric transducers are being used, are configured to be massive elastic connecting elements, permit to transfer comparatively high frequencies or vibrations to the teats of the animal. The stimulation device permits to vary the frequency and/or the amplitude of the generated mechanical stimuli. More specifically if for example the variation in length is relatively large, the movement of the teat cups 302 has a relatively large horizontal component.

Further, the stimulation device of the invention makes it readily possible to first adjust the oscillating motion of the milking cups and, as a result thereof, of the collecting piece 303 in a way similar to that used in conventional lines, the frequency being independent of the pulsator frequency, and to additionally superpose higher frequency stimulation on the oscillating motion. Simple securing, for example to the milking cups as shown in the Fig., or to other suited sites such as the connecting sleeve for the milk tube 305 or the pulsator tube 304, is particularly advantageous, inter alia, in the case in which an already existing system is to be retrofitted therewith. If an electromagnetic transducer and/or a piezoelectric transducer are employed as a vibrator element 306, a current supply such as a battery may be integrated in the vibrator element 306 so that no additional lines are needed for the stimulation device. The vibrator element 306 may hereby be comprised of suited switch elements or of other actuator elements in order to adjust the frequency and/or amplitude of the mechanical vibrations generated. The vibrator element 306 may further be comprised of a timer permitting to perform a certain type of stimulation after a determined period of time. For example, a length of time required for pre-stimulating the animal prior to the actual milking process may be easily kept in this way, with the sequence of a pre-stimulation of one minute in length for example being optically or acoustically displayed.

In an automatic milking system which is not provided with a collecting piece (103, 203, 303), a suitably formed weight, which is coupled to the corresponding fluid lines, may be provided in order to keep the milking units oscillating or to reinforce their movement.

In a preferred embodiment, the milking system comprises a control unit that is connected to the stimulation device. This permits to perform stimulation programs that are adapted to every single animal and that differ from one animal to the other. Further, the operator has a choice of previously established stimulation programs from which to select the one permitting to yield an optimum milking result.

In still another advantageous embodiment, the milking system comprises sensors for example for the temperature and/or the milk flow and the like so that the control unit is capable of selecting the suited duration and/or intensity and/or frequency of a stimulus as a function of the evaluated sensor signals. A milk flow meter may for example permit to determine the actual flow rate and the quantity of milk already obtained and the stimulation may be adjusted according to the results of the measurements. If the milk flow is reduced and the milking time is accordingly longer or if large quantities of milk have already been obtained for example, the animal may be stimulated in a clearly different way after milking than it was during the actual milking process. It is also advantageous to record over a relatively long period of time results and stimulation types for the various animals so that optimum stimulation parameters may be selected for the animal of concern. Preferably, the control unit is therefore provided with a memory device and with an appropriate computer unit for evaluating and recording possible sensor signals and for selecting suited stimulation parameters. The control unit may thereby be a microprocessor provided in the vibrator element 306 or an external computer unit, with the data exchange taking place via an appropriate interface. The data are preferably wirelessly exchanged, for example through optical, acoustic or electromagnetic signals in order to avoid additional lines.

In another embodiment that has not been illustrated herein, the stimulation device of the invention comprises a heating system that is configured in such a manner that the inner volume of the teat rubber liner may be heated to temperatures ranging from 30 to 40.degree. C. The teat rubber liner is thereby heated by suited electrical heating elements provided on the milking cup and/or by fluidic channels carrying a temperature equalized fluid such as warm water. It is thereby advantageous to provide a temperature sensor in order to adjust the temperature to a desired value by means of a suited regulation. The heating system of the invention permits to additionally stimulate the animal since the temperature conditions at the teat accurately imitate those prevailing during the sucking performance of a calf.

Figure 3A:
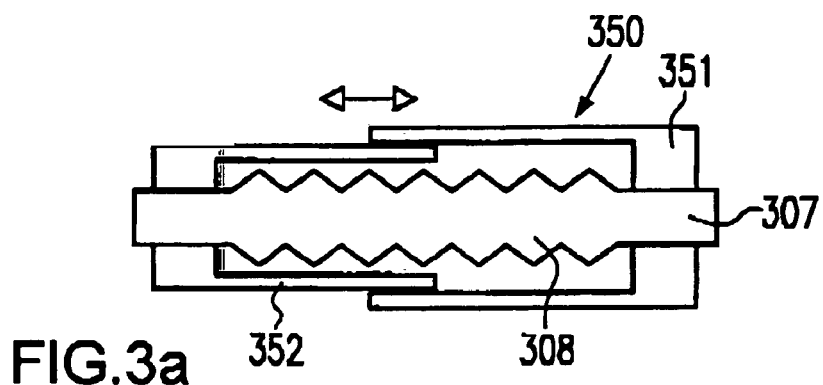
FIG. 3a is a schematic view for mechanically reinforcing a flexible region of variable length that is intended for use in the embodiments described with reference to the FIGS. 1 through 3.

FIG. 3*a* schematically shows a means for mechanically reinforcing the flexible region of variable length 308 (108, 208 for the embodiments described in the FIGS. 1 and 2). A reinforcing means 350 comprises an outer part 351 and an inner part 352, with the outer part 351 partially surrounding the inner part 352 and being slidable over said inner part in the longitudinal direction as indicated by the arrow. The outer part 351 and the inner part 352 are connected to the flexible element 307 (207, 104) by a respective one of their ends and surround at least in parts the flexible region of variable length 308 (208, 108). The reinforcing means is made of a relatively hard material, for example of a hard plastic material, a metal, a compound of various materials, of two or a plurality of layers of material, for example a plastic material with a metal braid or the like. The inner part 352 and the outer part 351 may each be secured to the element 307 (207, 104) by means of a hose clamp for example for releasable connection or the reinforcing means 350 may be durably connected to the element 307 (207, 104).

The mechanical reinforcement permits to efficiently protect the particularly sensitive region 308 (208, 108) from damage (e.g. due to the kick from an animal). The reinforcing means 350 may also be provided with a curvature so that it may be selectively adapted to the conditions of the respective one of the corresponding elements. Further, the "telescope" structure shown in FIG. 3*a* is to be construed as an exemplary embodiment only and diverse changes may be performed. The reinforcement means needs not completely radially surround the region 308 (208, 108). One or a plurality of longitudinal slots may be provided so that the region 308 (208, 108) may be visually appraised. Further, more than two "telescope" elements may be provided. A catch stop may be provided on the reinforcing means 350 so that the longitudinal movement is limited accordingly. The catch stop may, be adjustable so that a maximum variation in length of the region 308 (208, 108) may be adjusted according to need.

Figure 4:
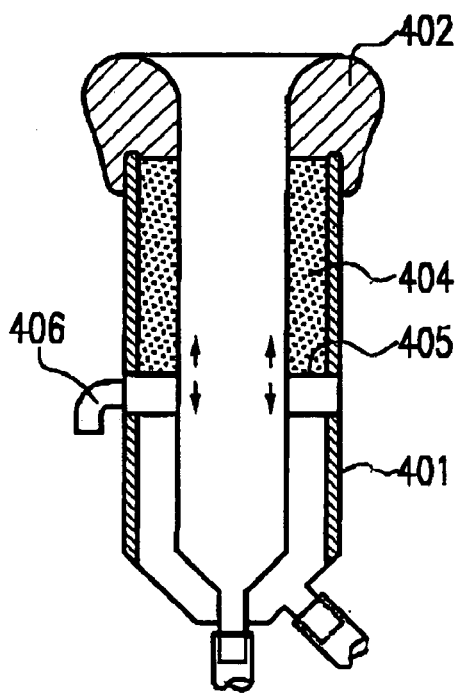
FIG. 4 is a cross-sectional schematic view of a milking cup with a filled intermediate region for massaging a teat.

FIG. 4 shows a schematic cross section of a milking cup 401 with a teat rubber liner 402, an intermediate region 404 between the teat rubber liner 402 and the milking cup 401 being filled with a deformable mass. The intermediate region 404 is connected to a coupling region 307 by means of a membrane 405. Further, the coupling region 307 is connected to the exterior side by means of a connecting sleeve 406.

In operation, pressure variations of suited intensity and frequency can be applied to the coupling region 307 by means of the connecting sleeve 306, said pressure variations being transmitted to the deformable mass 404 via the membrane 405. The transmitted pressure variations have a pleasant massage effect on the teat of the animal, thus providing an increase in stimulus intensity. A gel, a water-oil mixture, small pieces of material ranging from 0.5 mm to 5 mm or small pieces of material distributed in a solution or pellets and the like may advantageously be employed as deformable mass. It is further also possible not to provide a connection 406 as pressure variations, which are generated by the pulsator, are occurring anyway and possibly provide already sufficient massage effect. Excess pressure may further be applied to the coupling region 307 so that the teat may be locally stimulated by the pressure exerted onto the teat.

In another variant, a plurality of coupling regions 307 are provided so that the effect of excess pressure application and/or of pressure variations, on the teat may be locally intensified. Further, the membrane 405 may be configured to be an element with a grid-like structure if the deformable mass in the intermediate region 404 is provided in the form of small pieces of material in order to thus apply suited massage stimuli to the teat by supplying a fluid and carrying it away. Advantageously, one or a plurality of additional connections 406 with corresponding membranes 405 may be provided in order to efficiently lead a fluid, such as water through the intermediate region 404 and to apply a suited massage to the teat.

In another preferred embodiment, the teat rubber liner 402 and the intermediate region 404 with the membrane 405 and the coupling region 307 are configured to be one piece with the deformable mass advantageously being introduced therein during the manufacturing process. Alternatively, there may be provided an additional connection in the intermediate region 404 in order to introduce the deformable mass at a later stage or, if necessary, to replace it.

Figure 5:
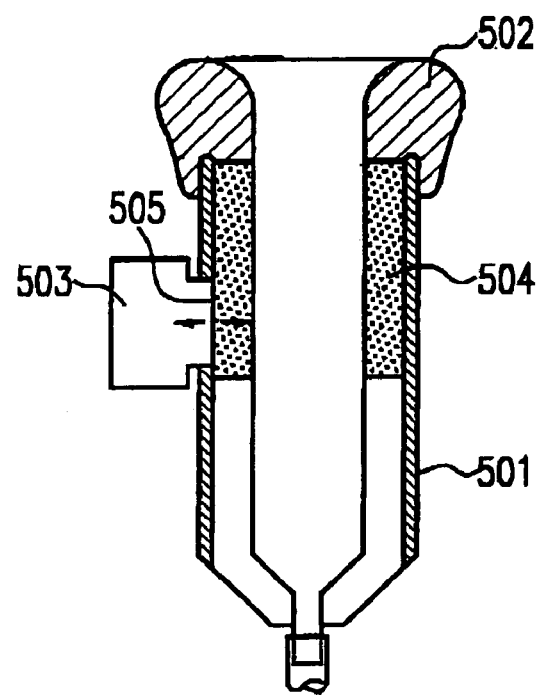
FIG. 5 is a schematic cross section of a milking cup with a filled intermediate region and with a vibrator element secured thereto.

FIG. 5 schematically shows another embodiment of a milking cup 501 with an intermediate region 504 that is provided between the milking cup 501 and a teat rubber liner 502 and is filled with a deformable mass. A membrane 505 is provided at a lateral opening of the milking cup 501, said membrane being coupled to a vibrator element 503. An electromagnetic and/or piezoelectric transducer is particularly suited to be employed as a vibrator element 503 so that vibrations of any frequency and amplitude may be transmitted to the deformable mass.

Advantageously, the teat rubber liner 502 and the milking cup 501 may thereby be configured in such a manner that, for better cleaning results, the two may be separated from one another like in conventional systems. A further advantage is that the vibrator element 503 is removably secured to a corresponding opening in the milking cup 501 so that the vibrator element 503 can be quickly removed or secured when the need arises.

Figure 6:
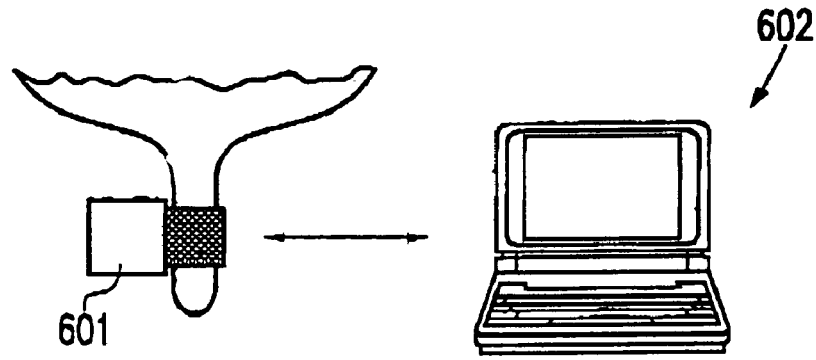
FIG. 6 is a schematic view of a system for stimulating an animal that is adapted for wireless communication with a central computer system.

FIG. 6 schematically shows a system for stimulating an animal with a mobile stimulation device 601 being connected to a computer unit 602. The stimulation system of the invention is particularly advantageous if a great number of animals is to be milked as the mobile stimulation device 601 may be fastened to the animal any time, for example after a milking process, so that the computer unit 602 may send corresponding, chronologically staggered signals before the next milking process for the mobile stimulation device 601 to generate corresponding stimuli. For this purpose, the computer unit 602 selectively sends appropriate signals, for example optical, acoustic or electromagnetic signals, in order to selectively actuate one or a group of four mobile stimulation devices 601. The mobile stimulation device 601 advantageously comprises an electromagnetic and/or piezoelectric vibrator element as well as a securing means such as a soft elastic tape so that the mobile stimulation device 601 may be quickly applied and removed and may remain on the animal over a quite long period of time without negative effect. Advantageously, the mobile stimulation device and the milking cup are configured in such a manner that the stimulation device may quickly and readily be secured to the milking cup during application of the same using for example a Velcro fastener or the like so that the teat may at need be further efficiently stimulated by the mobile stimulation device through a corresponding opening in the milking cup. Further, the mobile stimulation device may also be used independent of the computer unit 602. For this purpose, an adjustable timer is provided in the mobile stimulation device, said timer causing the stimulation device to apply the stimuli at the proper time.

In another embodiment (not shown), which is advantageously combined with all of the embodiments described herein above, there is provided a stimulation system for optical and/or acoustic stimulation. A visual and/or acoustic stimulus may thereby be applied individually for every single animal or for a group of animals. There may for example be provided a loudspeaker system that controllably delivers acoustic stimuli. A recorded sound of a calf may thereby be delivered in order to simulate a natural situation. Diverse sounds may be further delivered, either in addition or instead. Advantageously, control is performed by a suited control unit which controls the delivery of the acoustic stimuli in compliance with control parameters such as the time of the day, the duration or phase of the milking process, and so on. The same applies to the delivery of optical stimuli, which are generated in the form of adapted lighting color and intensity, up to the delivery of complex stimuli (scenery, animated pictures, and so on), which are for example generated by a video recorder. Further, the acoustic and/or optical stimuli may be supplied to the various animals by providing them with suited head coverings. More specifically, the acoustic stimulation such as the call of a young animal can be advantageously used to attract the animal to be milked to the milking site. This method is particularly advantageous when combined with what are termed milking robots as in this case the animals have to find the way to the milking robot by themselves. Baiting further permits to dictate a certain time frame for the milking process It should be noted that while various embodiments have been described herein above by way of example with reference to the schematic drawings, any combination of the various embodiments is possible. More specifically, the embodiment described with reference to FIG. 1 can be combined with all of the features of the embodiments described thereafter. Further the various stimulation devices may be utilized in a coordinated and regulated manner using a superior control system. This more specifically applies if, for a complete stimulation of the animal, acoustic, optical or other sensorial stimuli are used in addition to the physically applied ones.

The invention claimed is:

1. An automatic milking device comprising:
several milking cups, each said cup including a liner;
a pulsator system including flexible pulsator tubes, each connecting to a corresponding one of the milking cups;
a collecting piece for collecting milk;
flexible milk collecting tubes, each said milk collecting tube connected at a first end to one of the milking cups and connected at a second end to said collecting piece;
a vacuum device for supplying a negative pressure to the milk collecting tubes to collect milk and the pulsator system to periodically supplying negative pressure and atmospheric pressure to the pulsation tubes; and
a stimulation device comprising:
a flexible fluid connecting line, the length of which is in parts variable, the flexible fluid connecting line being secured at a first end to one of the milking cups; and
a controller secured to a second end of the flexible fluid connecting line providing at least one of negative and positive pressure variations to vary the length of the flexible fluid connecting line and providing a horizontal stimulation motion to the milking cup independent from said flexible pulsator tubes and said flexible milk collecting tubes, wherein the stimulation device provides stimulation at a frequency different and independent from the frequency of the pulsator system and independent of the milking process.

2. The automatic milking device according to claim 1, wherein said controller comprises a controllable valve element.

3. The automatic milking device according to claim 2, wherein the controllable valve element comprises an electromagnetic valve element.

4. The automatic milking device according to claim 2, wherein the controllable valve element comprises a pneumatic valve element.

5. The automatic milking device according to claim 2, wherein there is provided a control unit that controls the controllable valve element of the stimulation device in compliance with a functional sequence implemented in the control unit.

6. The automatic milking device according to claim 5, wherein there is provided a timer so that the control unit controls the stimulation device as a function of the milking time.

7. The automatic milking device according to claim 5, wherein a milk flow sensor is provided so that the control unit controls the stimulation device as a function of at least one of the quantities of milk already achieved and of the actual milk flow.

8. The automatic milking device according to claim 5, wherein a temperature sensor and a control circuit are provided so that the temperature within the milking cup is regulatable.

9. The automatic milking device according to claim 8, wherein the control circuit is connected to the control unit so that the stimulation device and the temperature are interdependently controllable.

10. The automatic milking device according to claim 5, wherein the control unit comprises a data entry region through which data related to an animal to be milked is entered by at least one of manually and by a machine.

11. The automatic milking device according to claim 5, wherein the control unit comprises a memory region in which data related to the milking process is stored.

12. The automatic milking device according to claim 1, wherein the stimulation device includes an additional stimulation system for at least one of optical and acoustic stimulation.

13. The automatic milking device according to claim 12, wherein the additional stimulation system comprises a head covering with an integrated loudspeaker system.

14. The automatic milking device according to claim 12, wherein the additional stimulation system generates light of adjustable color.

15. The automatic milking device according to claim 2, wherein the stimulation device provides stimulation at a frequency of up to about 20 Hz.

16. The automatic milking device of claim 1, wherein the flexible fluid connecting line comprises a plurality of additional said fluid connecting lines, each of said fluid connecting lines being secured at one end to one of the respective milking cups.

17. The automatic milking device of claim 1, wherein the milking cups have a cylindrical shaped portion and said flexible fluid connecting line is mounted horizontally to the cylindrical shaped portion of one of the milking cups.

* * * * *